United States Patent
You et al.

(10) Patent No.: US 11,055,083 B2
(45) Date of Patent: Jul. 6, 2021

(54) METHOD AND APPARATUS FOR UPDATING VEHICLE SOFTWARE USING OTA

(71) Applicants: Hyundai Motor Company, Seoul (KR); Kia Motors Corporation, Seoul (KR)

(72) Inventors: Hye Won You, Seoul (KR); Sang Seok Lee, Yongin-si (KR); Young Woo Park, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 129 days.

(21) Appl. No.: 16/373,468

(22) Filed: Apr. 2, 2019

(65) Prior Publication Data

US 2020/0167144 A1    May 28, 2020

(30) Foreign Application Priority Data

Nov. 23, 2018    (KR) .................. 10-2018-0146148

(51) Int. Cl.
| | |
|---|---|
| *G06F 9/445* | (2018.01) |
| *G06F 8/65* | (2018.01) |
| *H04W 4/40* | (2018.01) |
| *H04L 29/08* | (2006.01) |
| *B60R 16/023* | (2006.01) |

(52) U.S. Cl.
CPC .............. *G06F 8/65* (2013.01); *B60R 16/023* (2013.01); *H04L 67/34* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 6,356,961 B1 * | 3/2002 | Oprescu-Surcobe ... | G06F 8/658 710/20 |
| 8,656,020 B1 * | 2/2014 | Rademacher ....... | G06F 16/9574 709/226 |
| 2004/0152455 A1 * | 8/2004 | Herle .................. | G06F 8/658 455/418 |
| 2011/0225119 A1 * | 9/2011 | Wong ................... | G06F 16/219 707/609 |
| 2017/0242678 A1 * | 8/2017 | Sangameswaran ..... | G06F 8/65 |
| 2017/0249140 A1 * | 8/2017 | Sun ...................... | G06F 8/658 |
| 2020/0057628 A1 * | 2/2020 | Sano .................... | B60W 50/00 |

* cited by examiner

*Primary Examiner* — Wei Y Zhen
*Assistant Examiner* — Lanny N Ung
(74) *Attorney, Agent, or Firm* — Morgan, Lewis & Bockius LLP

(57) ABSTRACT

A method and apparatus configured for updating vehicle software using over-the-air (OTA) may include extracting first format difference data and second format difference data, corresponding to a first format and a second format of an update target software image, respectively, comparing the first format difference data and the second format difference data, determining a format of difference data as a transmission target, based on the comparison result, and transmitting the determined format of difference data to an update target vehicle terminal through a wireless network. Accordingly, it is advantageous to minimize the amount of transmitted data while vehicle software is updated using OTA.

23 Claims, 6 Drawing Sheets

METHOD AND APPARATUS FOR UPDATING VEHICLE SOFTWARE USING OTA

CROSS-REFERENCE TO RELATED APPLICATION

The present application claims priority to Korean Patent Application No. 10-2018-0146148, filed on Nov. 23, 2018, the entire contents of which is incorporated herein for all purposes by this reference.

BACKGROUND OF THE INVENTION

Field of the Invention

The present invention relates to a method and apparatus configured for updating vehicle software, and more particularly, to a method and apparatus configured for updating vehicle software, for minimizing the amount of transmitted data while vehicle software is updated using over-the-air (OTA).

Description of Related Art

A conventional method of updating software is broadly classified into a background update method and a difference update method.

The background update method is a method of doubly storing the same software image in a memory and updating software to update software while a vehicle is driven and a system is used. In the instant case, a software image may be compressed and manage to reduce a capacity of the memory used to store the software image.

The difference update method is a method of updating software using a difference between an original software image and a target software image to reduce the amount of data transmitted through a wireless network when software for a vehicle is updated through over-the-air (OTA).

Referring to FIG. 1, in a firmware over-the-air (FOTA) method of wirelessly updating firmware for a vehicle, a difference (delta, or diff) between two software versions, i.e., a source version V1 and a target version V2 is extracted, and as such, a difference package generated using the extracted difference may be transmitted to a vehicle terminal through a wireless network. The vehicle terminal may maintain only the source version V1, and may generate and update the target version V2 using the received source version V1 and the difference package.

Referring to FIG. 2, when the received difference package is present, the vehicle terminal may execute an update agent. The vehicle terminal may perform updating based on a region with a specific size of a flash memory included in the vehicle terminal. The update agent may bring a change region to random-access memory (RAM) from the source version V1, and as such, may apply a corresponding region of the difference package to generate the target version V2.

The update agent may overwrite the generated target version V2 on the existing source version V1 to re-accumulate the target version V2 generated using the source version V1 and the difference package, in a flash memory.

In the conventional difference update method, a simple difference between the original software image and the update software image, i.e., the target image is extracted and updating is performed irrespective of a format of a software image stored in an actual terminal. However, when the software image used in the vehicle terminal is compressed, the size of difference data, i.e., a capacity of the difference package may be increased compared with the case in which a difference is extracted in a non-compression state. This is because binary arrangement of software is randomly changed during compression.

On the other hand, when a software image is stored in a non-compression format to reduce the amount of difference data transmitted through OTA, there is a problem in that a storage capacity of a vehicle terminal for background update is excessively increased.

Accordingly, there is a demand for a method of minimizing both a capacity of difference data used to update vehicle software through OTA and a storage capacity of a vehicle terminal used for background updating.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and apparatus configured for updating vehicle software using over-the-air (OTA).

Various aspects of the present invention are directed to providing a method and apparatus configured for updating vehicle software using OTA, for minimizing a capacity of difference data and a storage capacity required by a vehicle terminal for background updating.

Additional advantages, objects, and features of the present invention will be set forth in part in the description which follows and in part will become apparent to those having ordinary skill in the art upon examination of the following or may be learned from practice of the present invention. The objectives and other advantages of the present invention may be realized and attained by the structure particularly pointed out in the written description and claims hereof as well as the appended drawings.

Various aspects of the present invention are directed to providing a method and apparatus configured for updating vehicle software using over-the-air (OTA).

To achieve these objects and other advantages and in accordance for an exemplary embodiment of the present invention, as embodied and broadly described herein, a method of updating vehicle software in a server may include extracting first format difference data and second format difference data, corresponding to a first format and a second format of an update target software image, respectively, comparing a size of the first format difference data and a size of the second format difference data, determining a format of difference data as a transmission target, based on the comparison result, and transmitting the determined format of difference data to an update target vehicle terminal through a wireless network, wherein difference data with a smaller size among the first format difference data and the second format difference data is determined as transmission target difference data.

The method may further include transmitting a first control signal indicating which format of difference data is determined as the transmission target, to the vehicle terminal, prior to the transmitting of the determined format of difference data, wherein the vehicle terminal may drive a system using a format of software image, which is not the determined format, according to the first control signal.

The method may further include receiving a second control signal indicating whether the system is completely driven, from the vehicle terminal, wherein transmitting of the determined format of difference data may be initiated according to the second control signal.

The determined format of difference data may be transmitted through over-the-air (OTA).

The first format may be a compression format, and the second format may be a non-compression format.

The first format difference data may be extracted based on a difference between a first version of compression software image and a second version of compression software image, the second format difference data may be extracted based on a difference between a first version of non-compression software image and a second version of non-compression software image, and the second version may be a higher-ranking version than the first version.

The first format and the second format may have different file extensions.

The software image may be classified depending on a category, and the first format and the second format of software images for respective categories may be maintained and managed in a corresponding region of a storage included in the server.

In another aspect of the present invention, a server may include a storage unit configured to maintain a first format of software image and a second format of software image, an extraction unit configured to extract first format difference data and second format difference data, corresponding to a first format and a second format of an update target software image, respectively, a comparison unit configured to compare a size of the first format difference data and a size of the second format difference data, a controller configured to determine a format of difference data as a transmission target, based on the comparison result, and a communication unit configured to transmit the determined format of difference data to an update target vehicle terminal through a wireless network, wherein the controller is configured to determine difference data with a smaller size among the first format difference data and the second format difference data as transmission target difference data.

The controller may be configured to generate a first control signal indicating which format of difference data is determined as the transmission target and may transmit the first control signal to the vehicle terminal through the communication unit, prior to transmitting of the determined format of difference data, and the vehicle terminal may drive a system using a format of software image, which is not the determined format, according to the first control signal.

Upon receiving a second control signal indicating whether the system is completely driven, from the vehicle terminal, the controller may perform control to transmit the determined format of difference data to the vehicle terminal, according to the second control signal.

The determined format of difference data may be transmitted through over-the-air (OTA).

The first format may be a compression format, and the second format may be a non-compression format.

The first format difference data may be extracted based on a difference between a first version of compression software image and a second version of compression software image, the second format difference data may be extracted based on a difference between a first version of non-compression software image and a second version of non-compression software image, and the second version may be a higher-ranking version than the first version.

The first format and the second format may have different file extensions.

The software image may be classified depending on a category, and the first format and the second format of software images for respective categories may be maintained and managed in the storage unit.

In another aspect of the present invention, a method of updating vehicle software in a vehicle which is operatively associated with a server through a wireless network may include receiving a first control signal indicating which format of difference data is determined as a transmission target, from the server, driving a system using a format of software image, which is not determined as the transmission target, transmitting a second control signal indicating whether the system is completely driven, to the server, receiving the format of difference data determined as the transmission target, from the server, and background-updating a format of software image, corresponding to the received difference data, using the received difference data.

The method may further include re-driving the system using the software image which is completely background-updated.

The method may further include verifying whether a current time is a vehicle idle time after the system is re-driven, as the checking result, when the current time is the vehicle idle time, converting a format of the completely background-updated software image, and updating a format of software image, which is not determined as the transmission target, using the converted format of software image.

The converting of the format may include decompressing the completely background-updated software image when a format of the software image is a compression format, and compressing the completely background-updated software image when a format of the software image is a non-compression format.

The method may further include, as the checking result, when the current time is the vehicle idle time, temporally stopping updating which is being performed.

In another aspect of the present invention, an apparatus configured for updating vehicle software in conjunction with a server through a wireless network may include a storage unit configured to maintain a software image with a plurality of different formats, a communication unit configured to receive a first control signal indicating which format of difference data is determined as the transmission target, from the server, a driver configured to drive a system using a format of software image, which is not determined as the transmission target, and an updating unit configured to background-update a format of software image, corresponding to the format determined as the transmission target, using the format of difference data determined as the transmission target, received from the server after the system is completely driven.

The driver may re-drive the system using the completely background-updated software image.

After the system is re-driven, when a current time is a vehicle idle time, the updating unit may convert a format of the completely background-updated software image, and may update a format of software image, which is not determined as the transmission target, using the converted format of software image.

The updating unit may decompress the completely background-updated software image when a format of the software image is a compression format, and may compress the completely background-updated software image when a format of the software image is a non-compression format.

When the current time is the vehicle idle time, the updating unit may temporally stop updating which is being performed by the updating unit.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
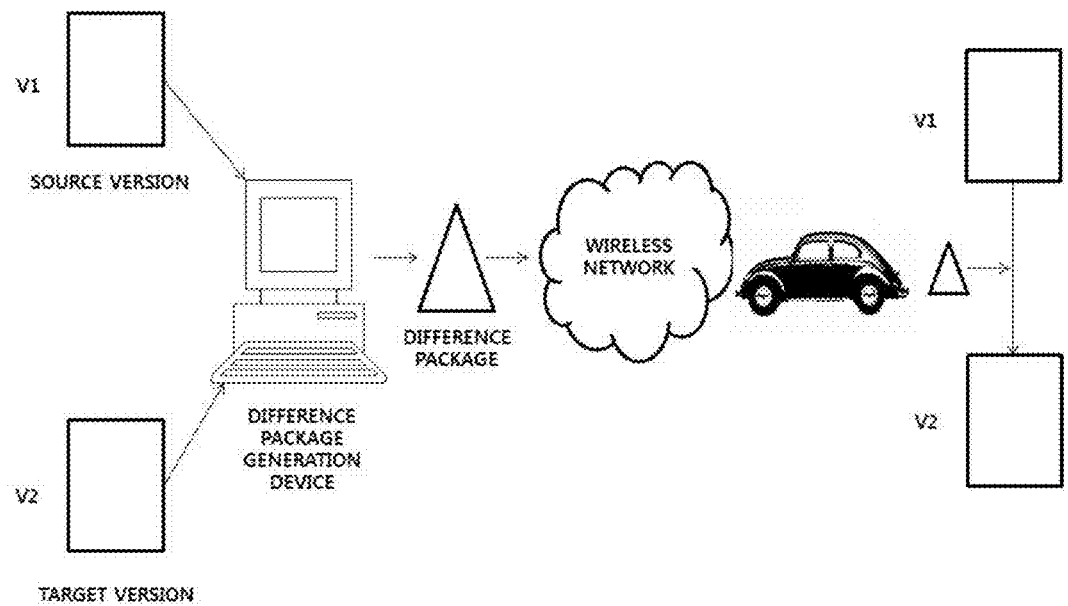
FIG. 1 and FIG. 2 are diagrams for explanation of a conventional procedure of updating vehicle software using a difference package.
Figure 2:
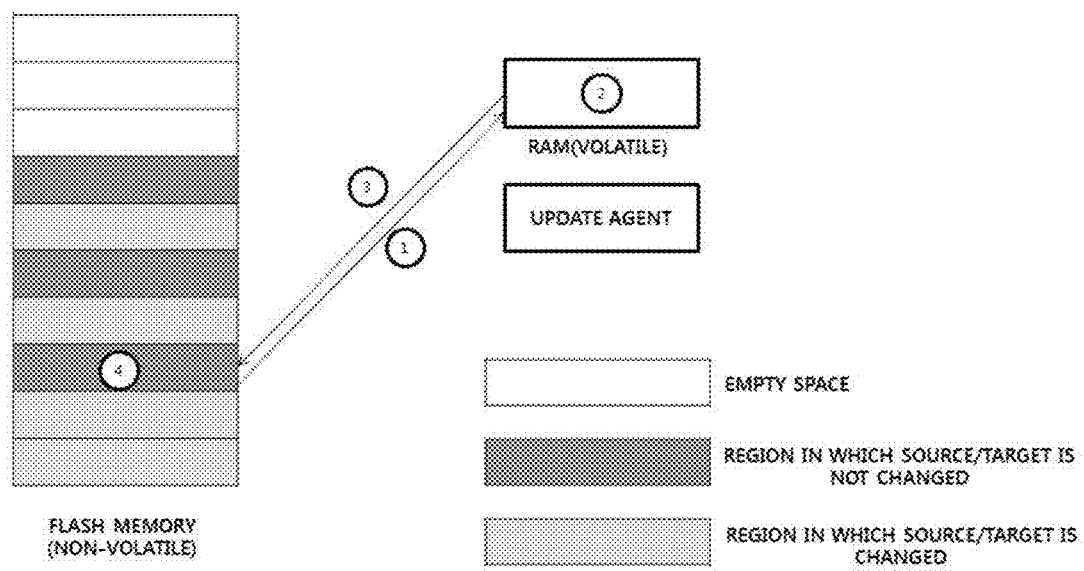

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, devices and various methods, to which embodiments of the present invention are applied, will be described in more detail with reference to the accompanying drawings. The suffixes "module" and "unit" of elements herein are used for convenience of description and thus may be used interchangeably and do not have any distinguishable meanings or functions.

Hereinafter, a method and apparatus configured for updating vehicle software according to various embodiments will be described in detail with reference to FIG. 3, FIG. 4, FIG. 5 and FIG. 6.

Figure 3:
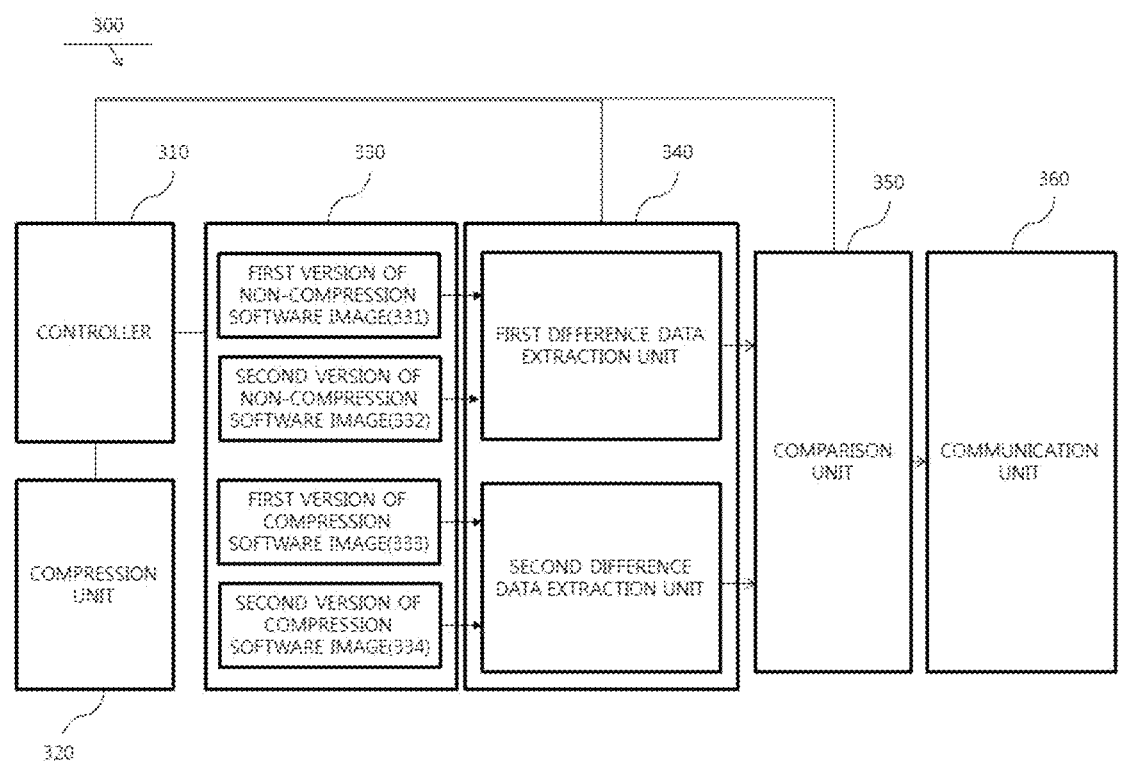
FIG. 3 is a block diagram for explanation of the configuration of a server for updating vehicle software in conjunction with a vehicle through a wireless network according to an exemplary embodiment of the present invention.

FIG. 3 is a block diagram for explanation of the configuration of a server for updating vehicle software in conjunction with a vehicle through a wireless network according to an exemplary embodiment of the present invention.

Referring to FIG. 3, a server 300 may include a controller 310, a compression unit 320, a storage unit 330, an extraction unit 340, a comparison unit 350, and a communication unit 360.

The controller 310 may control an overall operation and input/output of the server 300. A control operation of the controller 310 will be more obvious based on the following description.

The compression unit 320 may perform a function of compressing or decompressing the corresponding software image.

For example, when an update target software image input to the server 300 is in a compression format, the compression unit 320 may decompress the corresponding software image, and when the input update target software is in a non-compression format, the compression unit 320 may decompress the corresponding software image. In the instant case, the compressed or decompressed software image may be maintained and managed in a corresponding recording region of the storage unit 330.

Different formats of software image for respective software versions may be recorded and maintained in the storage unit 330.

For example, the software version may include a source version and a target version. Here, the target version may refer to a higher-ranking version than the source version and may refer to a software version including information to be updated. Hereinafter, for convenience of description, the source version is referred to as a 'first version' and the target version is referred to as a 'second version'.

According to an exemplary embodiment of the present invention, a format may be classified according to how a software image is compressed. Hereinafter, for convenience of description, a compressed software image format is defined as a 'first format', and a non-compressed software image format is defined as a 'second format'. In the above embodiments, although the case in which a format is classified according to whether a software image is compressed has been described, this is merely an exemplary embodiment of the present invention, and it may be noted that a specific format change is also applicable to an exemplary embodiment of the present invention as long as the corresponding format change affects the size of changed data, i.e., difference data, of the corresponding software image. For example, a format may be classified according to a file extension. In the instant case, the number of formats is not limited.

According to another exemplary embodiment of the present invention, a software image may be classified depending on a category, and different formats of software images for respective corresponding categories may be maintained in the storage unit 330.

Here, the category may be classified depending on use/purpose of a corresponding software image, a type of a system to which the corresponding software image is applied, and the like, but is not limited thereto.

Furthermore, different difference data transmission algorithms may be applied depending on categories. For example, the server 300 may perform control to background-update a virtual reality related software image using a non-compression format of difference data, may perform control to background-update a road guidance related software image using a compression format of difference data, and may perform control to background-update a vehicle communication related software image using difference data with a smaller size among a non-compression format of difference data and a compression format of difference data.

The extraction unit 340 may extract first format difference data and second format difference data which correspond to a first format and a second format of the update target software image, respectively.

Referring to FIG. 3, a first difference data extraction unit may extract first format difference data corresponding to a first format, i.e., a non-compression format, and a second difference data extraction unit may extract second format difference data corresponding to a second format, i.e., a compression format.

The first format difference data may be extracted based on a difference between a first version of non-compression software image 331 and a second version of non-compression software image 332, and the second format difference data may be extracted based on a difference between a first version of compression software image 333 and a second version of compression software image 334. In the instant case, the second version may be a higher-ranking version than the first version.

The comparison unit 350 may compare a size of the first format difference data and a size of the second format difference data.

The controller 310 may determine a format of difference data as a transmission target, based on the comparison result of the comparison unit 350. For example, the controller 310 may determine difference data with a smaller size among the first format difference data and the second format difference data, as difference data as a transmission target.

The communication unit 360 may transmit the corresponding format of difference data to the update target vehicle terminal through a wireless network according to the determination of the controller 310.

In the instant case, information on the update target vehicle terminal may be maintained in a predetermined recording region of the server 300 or may be acquired from another server connected via a network.

The controller 310 may generate a first control signal indicating which format of difference data is determined as a transmission target prior to transmitting of the determined format of difference data, and may transmit the first control signal to the corresponding vehicle terminal through the communication unit 360. In the instant case, the corresponding vehicle terminal may drive a corresponding system using a different format of software image from the determined format, according to the first control signal. For example, when the determined format is a compression format, upon receiving the first control signal, the vehicle terminal may drive a system using a non-compression format of software image and may update a compression format of software image using the received compression format of difference data.

This may be advantageous in that a vehicle system function is normally maintained even in a state in which a background update procedure is performed in a vehicle.

When the background update procedure is completed, the vehicle terminal may load a recent upgraded software image to a corresponding system and may drive the system.

Upon receiving a second control signal, indicating that the system is completely driven, from the vehicle terminal, the controller 310 may perform control to transmit the determined format of difference data to the vehicle terminal using an over-the-air (OTA) method.

Figure 4:
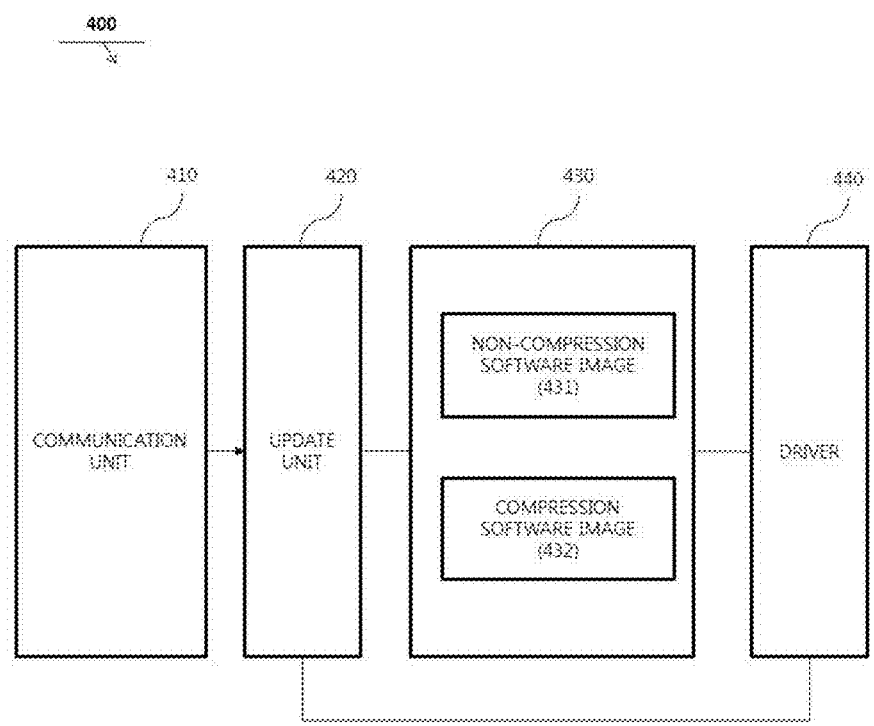
FIG. 4 is a block diagram for explanation of a structure of a vehicle software update apparatus configured for updating vehicle software in conjunction with a server through a wireless network according to an exemplary embodiment of the present invention.

FIG. 4 is a block diagram for explanation of a structure of a vehicle software update apparatus configured for updating vehicle software in conjunction with a server through a wireless network according to an exemplary embodiment of the present invention.

Referring to FIG. 4, the vehicle software update apparatus 400 may include a communication unit 410, an update unit 420, a storage unit 430, and a driver 440.

The communication unit 410 may be connected to the server 300 through a wireless network to transmit and receive various control signal and data.

The storage unit 430 may record and maintain a software image with a plurality of different formats. Hereinafter, a description will be provided in terms of the case in which a format is classified according to whether a software image is compressed, but this is merely an exemplary embodiment and format classification is not limited thereto.

The communication unit 410 may receive the first control signal indicating which format of difference data is determined as a transmission target, from the server 300.

The driver 440 may identify a format which is not determined as a transmission target, based on the first control signal.

The driver 440 may read a format of software image, which is not determined as a transmission target, from the storage unit 430, and then, may load the read format of software image to a corresponding system and may drive the system.

The communication unit 410 may transmit a second control signal indicating that a system is completely driven to the server 300 using the format of software image, which is not determined as a transmission target.

As such, the communication unit 410 may receive the format of difference data, which is determined as a transmission target, from the server 300 through OTA.

When the system is completely driven using the format of software image, which is not determined as a transmission target, the update unit 420 may background-update a software image corresponding to the format determined as a transmission target, using the received difference data.

For example, when the format determined as a transmission target is a first format which is a compression format, the update unit 420 may update, i.e., upgrade a compression software image 432 recorded in the storage unit 430 using the received difference data.

On other hand, when the format determined as a transmission target is a second format which is a non-compression format, the update unit 420 may update i.e., upgrade a non-compression software image 431 recorded in the storage unit 430 using the received difference data.

When a background update using the received difference data is completed, the update unit 420 may transmit a third control signal indicating that the background update procedure is completed, to the driver 440.

The driver 440 may re-drive the corresponding system using the update-completed format of software image according to the third control signal.

After the system is re-driven, the update unit 420 may determine whether a current time is a vehicle idle time. Here, the vehicle idle time may be determined based on whether a vehicle is driven, a utilization ratio of a central processing unit (CPU) of a vehicle terminal, a time zone, and the like, but is not limited thereto.

Upon determining that a current time is the vehicle idle time, the update unit 420 may convert the background update-completed software image, and may update the format of software image, which is not determined as a transmission target, using the converted format of software image.

For example, when the background-updated software image is the compression software image 432, the update unit 420 may decompress the recent upgraded compression software image 432, and may overwrite the existing non-compression software image 431 by the decompressed software image to upgrade both the non-compression and compression format of software images 431 and 432 to a recent version. Therethrough, the update unit 420 may synchronize both the non-compression and compression format of software images 431 and 432 maintained in the storage unit 430, to a recent version.

On the other hand, when the background-updated software image is the non-compression software image 431, the update unit 420 may compress the recent upgraded non-compression software image 431 and may overwrite the existing compression software image 432 by the compressed software image to upgrade both the non-compression and compression format of software images 431 and 432 to a recent version. Therethrough, the update unit 420 may synchronize both the non-compression and compression format of software images 431 and 432 maintained in the storage unit 430 to the recent version.

Upon determining that a current is not a vehicle idle time, the update unit 420 may temporally stop updating which is being performed, i.e., a synchronization operation.

For example, the vehicle terminal may also be automatically booted to perform the synchronization operation.

Figure 5:
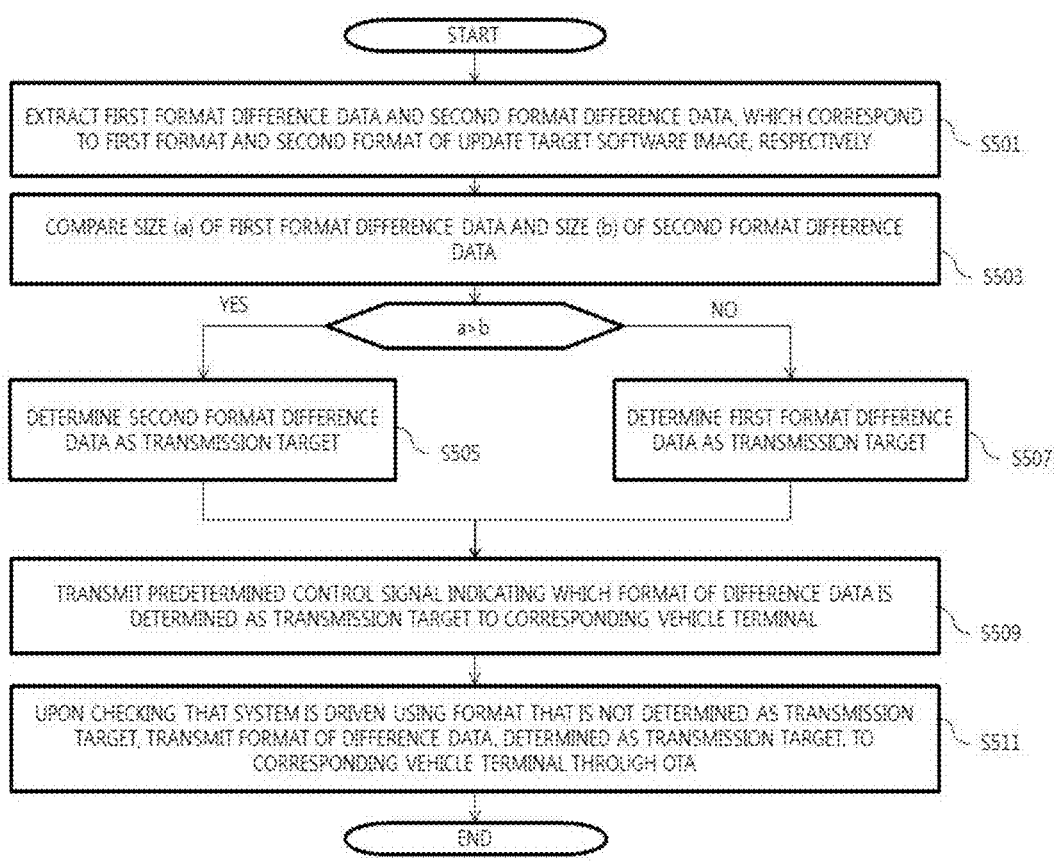
FIG. 5 is a flowchart for explanation of a method of updating vehicle software in a server which is operatively associated with a vehicle through a wireless network according to an exemplary embodiment of the present invention.

FIG. 5 is a flowchart for explanation of a method of updating vehicle software in a server which is operatively associated with a vehicle through a wireless network according to an exemplary embodiment of the present invention.

Referring to FIG. 5, the server 300 may extract first format difference data and second format difference data, which correspond to a first format and a second format of the update target software image, respectively (S501). For example, the first format may be a compression format and the second format may be a non-compression format.

Here, the first format difference data may be extracted based on a difference between the first version of compression software image and the second version of compression software image, the second format difference data may be extracted based on a difference between the first version of non-compression software image and the second version of non-compression software image, and the second version may be a higher-ranking version than the first version.

The server 300 may compare a size 'a' of the first format difference data and a size 'b' of the second format difference data (S503).

The server 300 may determine a format of difference data as a transmission target, based on the comparison result.

For example, when 'a' is greater than 'b', the server 300 may determine the second format difference data as a transmission target (S505), and otherwise, the server 300 may determine the second format difference data as a transmission target (S507).

The server 300 may transmit a first control signal indicating which format of difference data is determined as a transmission target prior to transmitting of the determined format of difference data, to the corresponding vehicle terminal (S509).

Upon receiving the first control signal, the vehicle terminal according to an exemplary embodiment of the present invention may load a format of software image, which is not the determined format, from an internal memory, and may drive a corresponding system.

Upon checking that the system is driven using a software image corresponding to the format which is not determined as a transmission target, the server 300 may transmit the format of difference data, determined as a transmission target, to the corresponding vehicle terminal through OTA (S511).

Although the exemplary embodiment of FIG. 5 in which a format of a software image is classified according to whether the software image is compressed is described, this is merely an exemplary embodiment of the present invention, and it may be noted that a specific format change is also applicable to an exemplary embodiment of the present invention as long as the corresponding format change affects the size of changed data, i.e., difference data. For example, a format may be classified according to a file extension. In the instant case, the number of formats is not limited.

According to another exemplary embodiment of the present invention, a software image may be classified depending on a category, and different formats of software images for respective corresponding categories may be maintained in the storage unit 330.

Here, the category may be classified depending on use/purpose of a corresponding software image, a type of a system to which the corresponding software image is applied, and the like, but is not limited thereto.

Figure 6:
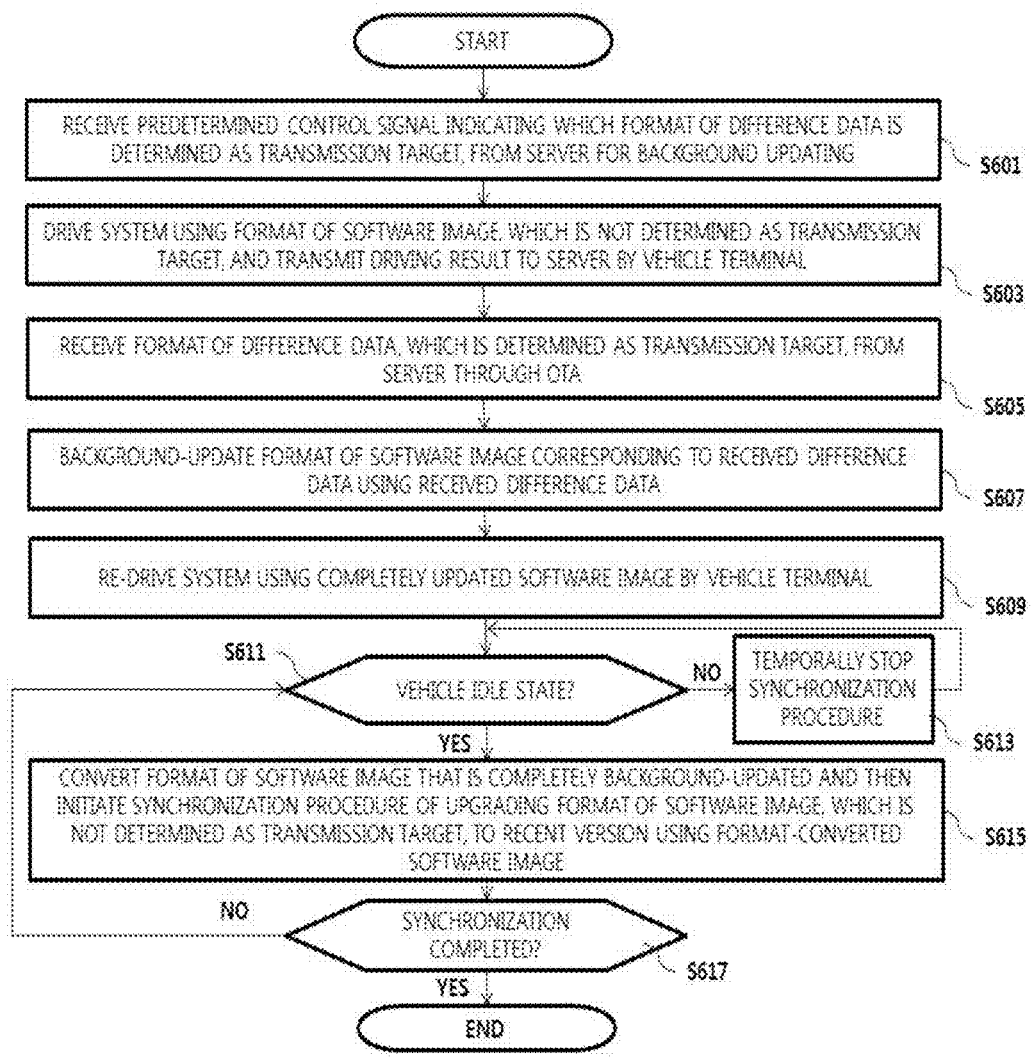
FIG. 6 is a flowchart for explanation of a method of updating vehicle software in a vehicle which is operatively associated with a server through a wireless network according to an exemplary embodiment of the present invention.

FIG. 6 is a flowchart for explanation of a method of updating vehicle software in a vehicle which is operatively associated with a server through a wireless network according to an exemplary embodiment of the present invention.

According to the exemplary embodiment of the present invention, the vehicle may refer to a vehicle terminal, a vehicle telematics terminal, or an audio video navigation (AVN) terminal, which is disposed in an actual vehicle and performs wireless communication with an external server.

Referring to FIG. 6, the vehicle may receive a first control signal indicating which format of difference data is determined as a transmission target, from the server 300 for background updating (S601).

The vehicle may drive a system using a format of software image, which is not determined as a transmission target. In the instant case, the format which is not determined as a transmission target may be identified based on a first signal. As such, the vehicle may transmit a second control signal indicating that a system is completely driven using the format of software image, which is not determined as a transmission target, to the server 300 (S603).

The vehicle may receive the format of difference data, which is determined as a transmission target, from the server 300 through OTA (S605).

The vehicle may background-update the format of software image corresponding to the received difference data using the received difference data (S607).

The vehicle may re-drive the system using the software image which is completely background-updated (S609).

The vehicle may determine whether a current time is a vehicle idle time after the system is re-driven (S611).

As the determination result, when the current time is the vehicle idle time, the vehicle may convert the format of software image which is completely background-updated, and then, may initiate a synchronization procedure of upgrading the format of software image, which is not determined as a transmission target, to a recent version using the format-converted software image (S615).

As the determination result of operation 611 above, when the current time is the vehicle idle time, the vehicle may temporally stop a synchronization procedure which is being performed (S613) and may monitor whether the current time enters the vehicle idle time.

The vehicle may check whether synchronization is completed (S617).

When synchronization is completed, the vehicle may terminate the vehicle software update procedure.

On the other hand, when synchronization is not completed, the vehicle may enter operation 611 above.

The method and apparatus according to an exemplary embodiment of the present invention may have the following effects.

The present invention may be advantageous to provide a method and apparatus configured for updating vehicle software using OTA.

The present invention may be advantageous to provide a method and apparatus configured for updating vehicle software using OTA, for minimizing a capacity of difference data transmitted through a wireless network and a storage capacity required by a vehicle terminal for background updating.

The present invention may be advantageous to rapidly update vehicle software through the above advantages.

Furthermore, the present invention may be advantageous to always extract minimized difference data in consideration of the characteristics of a software image used in a vehicle terminal.

It will be appreciated by persons skilled in the art that the effects that could be achieved with the present invention are not limited to what has been described hereinabove and other advantages of the present invention will be more clearly understood from the detailed description taken Although all elements forming the exemplary embodiments of the present invention are referred to as integrated into a single one or to be operated as a single one, the present invention is not necessarily limited to such embodiments. According to an exemplary embodiment of the present invention, all of the elements may be selectively integrated into one or more and be operated as one or more within the scope of the present invention. Each of the elements may be implemented as independent hardware. Alternatively, some or all of the elements may be selectively combined into a computer program having a program module performing some or all functions combined in one or more pieces of hardware. Code and code segments forming the computer program may be easily understood by those skilled in the art to which the present invention pertains. The computer program may be stored in computer readable media such that the computer program is read and executed by a computer to implement the present invention. Computer program storage media may include magnetic recording media, optical recording media, and the like.

The terms "comprises", "includes", and "has" described herein should be interpreted not to exclude other elements but to further include such other elements since the corresponding elements may be included unless mentioned otherwise. All terms including technical or scientific terms have the same meanings as understood by a person having ordinary skill in the art to which the present invention pertains unless mentioned otherwise. Generally used terms, such as terms defined in a dictionary, should be interpreted to coincide with meanings in the related art from the context. Unless differently defined in an exemplary embodiment of the present invention, such terms should not be interpreted in an ideal or excessively formal manner.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

The aforementioned vehicle Ethernet power consumption reducing method according to the aforementioned embodiment may be prepared in a program to be executable in a computer and may be stored in a computer readable recording medium. Examples of the computer readable recording medium include read-only memory (ROM), random-access memory (RAM), CD-ROMs, magnetic tapes, magnetic disks, floppy memories, optical data storage devices, etc. Furthermore, the computer readable recording medium can also be distributed over network coupled computer systems so that the computer readable code is stored, download, and executed in a distributed fashion.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of updating vehicle software in a server, the method comprising:
   extracting first format difference data and second format difference data, corresponding to a first format and a second format of an update target software image, respectively;
   comparing a size of the first format difference data and a size of the second format difference data;
   determining a format difference data as a transmission target, based on a result of comparing the size of the first format difference data and the size of the second format difference data;
   transmitting the determined format difference data to an update target vehicle terminal through a wireless network,
   wherein difference data with a smaller size among the first format difference data and the second format difference data is determined as transmission target difference data; and
   transmitting a first control signal indicating which the format difference data is determined as the transmission target, to the vehicle terminal, prior to the transmitting of the determined format difference data, wherein the vehicle terminal drives a system using a format of software image, which is not the determined format, according to the first control signal.

2. The method of claim 1, further including:
receiving a second control signal indicating when the system is completely driven, from the vehicle terminal, wherein the transmitting of the determined format difference data is initiated according to the second control signal.

3. The method of claim 1, wherein the determined format difference data is transmitted through over-the-air (OTA).

4. The method of claim 1, wherein the first format is a compression format, and the second format is a non-compression format.

5. The method of claim 4, wherein the first format difference data is extracted based on a difference between a first version of compression software image and a second version of the compression software image, the second format difference data is extracted based on a difference between a first version of non-compression software image and a second version of the non-compression software image, and the second version of the compression software image is a higher-ranking version than the first version of the compression software image and the second version of the non-compression software image is a higher-ranking version than the first version of teh non-compression software image.

6. The method of claim 1,
wherein the first format of the update target software image and the second format of the update target software image have different file extensions; and
wherein a software image is classified depending on a category, and a first format of the software image and a second format of the software image for respective categories are maintained and managed in a corresponding region of a storage included in the server.

7. A server comprising:
a storage unit configured to maintain a first format of software image and a second format of the software image;
an extraction unit connected to the storage unit and configured to extract first format difference data and second format difference data, corresponding to a first format and a second format of an update target software image, respectively;
a comparison unit connected to the extraction unit and configured to compare a size of the first format difference data and a size of the second format difference data;
a controller connected to the comparison unit and configured to determine a format difference data as a transmission target, based on a result of comparing the size of the first format difference data and the size of the second format difference data; and
a communication unit connected to the comparison unit and configured to transmit the determined format difference data to an update target vehicle terminal through a wireless network,
wherein the controller is configured to determine difference data with a smaller size among the first format difference data and the second format difference data as transmission target difference data,
wherein the controller is configured to generate a first control signal indicating which format difference data is determined as the transmission target and transmits the first control signal to the vehicle terminal through the communication unit, prior to transmitting of the determined format difference data, and
wherein the vehicle terminal drives a system using a format of software image, which is not the determined format, according to the first control signal.

8. The server of claim 7, wherein, upon receiving a second control signal indicating when the system is completely driven, from the vehicle terminal, the controller is configured to perform control to transmit the determined format difference data to the vehicle terminal, according to the second control signal.

9. The server of claim 7, wherein the determined format difference data is transmitted through over-the-air (OTA).

10. The server of claim 7, wherein the first format is a compression format, and the second format is a non-compression format.

11. The server of claim 10,
wherein the first format difference data is extracted based on a difference between a first version of compression software image and a second version of the compression software image,
wherein the second format difference data is extracted based on a difference between a first version of non-compression software image and a second version of the non-compression software image, and
wherein the second version of the compression software image is a higher-ranking version than the first version of the compression software image and the second version of the non-compression software image is a higher-ranking version than the first version of the non-compression software image.

12. The server of claim 7, wherein the first format of the software image and the second format of the software image have different file extensions.

13. The server of claim 7,
wherein the software image is classified depending on a category, and
wherein the first format and the second format of software images for respective categories are maintained and managed in the storage unit.

14. A method of updating vehicle software in a vehicle which is operatively associated with a server through a wireless network, the method comprising:
receiving, by a vehicle software update apparatus, a first control signal indicating which format difference data is determined as a transmission target, from the server;
driving, by the vehicle software update apparatus, a system using a format of a software image corresponding to a format difference data, which is not determined as the transmission target;
transmitting, by the vehicle software update apparatus, a second control signal indicating when the system is completely driven, to the server;
receiving, by the vehicle software update apparatus, the format difference data determined as the transmission target, from the server; and
background-updating, by the vehicle software update apparatus, the format of the software image, corresponding to the received format difference data, using the received difference data.

15. The method of claim 14, further including:
re-driving the system using the software image which is completely background-updated.

16. The method of claim 15, further including:
verifying when a current time is a vehicle idle time after the system is re-driven;

as a result of the verifying, when the current time is the vehicle idle time, converting a format of the completely background-updated software image; and updating a format of software image, which is not determined as the transmission target, using the converted format of software image.

17. The method of claim 16, wherein the converting of the format includes:

decompressing the completely background-updated software image when the format of the software image is a compression format; and compressing the completely background-updated software image when the format of the software image is a non-compression format.

18. The method of claim 16, further including:

as a result of the verifying, when the current time is the vehicle idle time, temporally stopping updating which is being performed.

19. An apparatus configured for updating vehicle software in conjunction with a server through a wireless network, the apparatus comprising:

a storage unit configured to maintain a software image with a plurality of different formats;

a communication unit configured to receive a first control signal indicating which format difference data of a software image among the plurality of different formats is determined as a transmission target, from the server;

a driver connected to the storage unit and configured to drive a system using a format different data corresponding to software image, which is not determined as the transmission target; and an updating unit connected to the communication unit and configured to background-update a format of software image, corresponding to the format determined as the transmission target, using the format difference data determined as the transmission target, received from the server after the system is completely driven.

20. The apparatus of claim 19, wherein the driver re-drives the system using a completely background-updated software image.

21. The apparatus of claim 20, wherein, after the system is re-driven, when a current time is a vehicle idle time, the updating unit converts a format of the completely background-updated software image, and updates a format of software image, which is not determined as the transmission target, using the converted format of software image.

22. The apparatus of claim 21, wherein the updating unit decompresses the completely background-updated software image when the format of the software image is a compression format, and compresses the completely background-updated software image when the format of the software image is a non-compression format.

23. The apparatus of claim 21, wherein, when the current time is the vehicle idle time, the updating unit temporally stops updating which is being performed by the updating unit.

* * * * *